United States Patent
Cashin

(10) Patent No.: US 8,683,598 B1
(45) Date of Patent: Mar. 25, 2014

(54) MECHANISM TO EVALUATE THE SECURITY POSTURE OF A COMPUTER SYSTEM

(75) Inventor: Timothy Cashin, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 100 days.

(21) Appl. No.: 13/364,462

(22) Filed: Feb. 2, 2012

(51) Int. Cl.
*G06F 11/30* (2006.01)
*G06F 12/14* (2006.01)
*G08B 23/00* (2006.01)

(52) U.S. Cl.
USPC .................. 726/25; 726/23; 726/24; 713/188

(58) Field of Classification Search
USPC ...................................... 726/23–25; 713/188
See application file for complete search history.

(56) References Cited

U.S. PATENT DOCUMENTS

| | | | | |
|---|---|---|---|---|
| 6,704,874 B1* | 3/2004 | Porras et al. | | 726/22 |
| 6,775,780 B1* | 8/2004 | Muttik | | 726/24 |
| 7,024,548 B1* | 4/2006 | O'Toole, Jr. | | 713/1 |
| 7,114,183 B1* | 9/2006 | Joiner | | 726/23 |
| 7,900,251 B1* | 3/2011 | Cheriton | | 726/16 |
| 8,001,606 B1* | 8/2011 | Spertus | | 726/25 |
| 8,001,610 B1* | 8/2011 | Chickering et al. | | 726/27 |
| 8,181,253 B1* | 5/2012 | Zaitsev et al. | | 726/25 |
| 8,201,257 B1* | 6/2012 | Andres et al. | | 726/25 |
| 8,239,953 B1* | 8/2012 | Satish et al. | | 726/25 |
| 8,291,498 B1* | 10/2012 | Liang et al. | | 726/24 |
| 2003/0188189 A1* | 10/2003 | Desai et al. | | 713/201 |
| 2004/0044912 A1* | 3/2004 | Connary et al. | | 713/201 |
| 2004/0187023 A1* | 9/2004 | Alagna et al. | | 713/200 |
| 2006/0026688 A1* | 2/2006 | Shah | | 726/25 |
| 2007/0107052 A1* | 5/2007 | Cangini et al. | | 726/22 |
| 2007/0124803 A1* | 5/2007 | Taraz | | 726/4 |
| 2007/0136814 A1* | 6/2007 | Lee et al. | | 726/25 |
| 2007/0143851 A1* | 6/2007 | Nicodemus et al. | | 726/25 |
| 2008/0005123 A1* | 1/2008 | Jung et al. | | 707/10 |
| 2009/0158302 A1* | 6/2009 | Nicodemus et al. | | 719/328 |
| 2009/0165132 A1* | 6/2009 | Jain et al. | | 726/22 |
| 2009/0282476 A1* | 11/2009 | Nachenberg et al. | | 726/22 |
| 2009/0328209 A1* | 12/2009 | Nachenberg | | 726/22 |
| 2010/0077479 A1* | 3/2010 | Viljoen | | 726/23 |
| 2010/0242111 A1* | 9/2010 | Kraemer et al. | | 726/22 |
| 2011/0197260 A1* | 8/2011 | Maes | | 726/3 |
| 2011/0197277 A1* | 8/2011 | Figlin et al. | | 726/23 |
| 2012/0036550 A1* | 2/2012 | Rodriguez et al. | | 726/1 |
| 2012/0066759 A1* | 3/2012 | Chen et al. | | 726/15 |
| 2012/0143650 A1* | 6/2012 | Crowley et al. | | 705/7.28 |

OTHER PUBLICATIONS

Chen, Thomas M. "Trends in viruses and worms." The Internet Protocol Journal 6.3 (2003).*

(Continued)

*Primary Examiner* — Michael Simitoski
(74) *Attorney, Agent, or Firm* — Lowenstein Sandler LLP

(57) ABSTRACT

A mechanism for evaluating the security posture of a computer system is described. In one embodiment, a method includes receiving data representing an event associated with a security component operating in an endpoint device, analyzing the received data to determine a score to assign to the event and a weighting factor to apply to the assigned score, updating a security component score of the security component with the assigned weighted score for the event, updating an overall security score for the endpoint device with the updated security component score, and providing the updated overall security score to an analysis component.

20 Claims, 5 Drawing Sheets

(56) References Cited

OTHER PUBLICATIONS

Symantec Corporation, "Symantec Endpoint Protection and Symantec Network Access Control Implementation Guide", 1059 pages, Jun. 27, 2011.

Symantec Corporation, "Symantec Endpoint Protection Getting Started Guide", 28 pages, Jun. 27, 2011.

Symantec Corporation, "Symantec Endpoint Protection and Symantec Network Access Control Client Guide", 143 pages, Jun. 27, 2011.

* cited by examiner

MECHANISM TO EVALUATE THE SECURITY POSTURE OF A COMPUTER SYSTEM

TECHNICAL FIELD

The methods and systems described below relate to data loss prevention. More specifically, a system and method for evaluating the security posture of a computer system are described.

BACKGROUND

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

To protect an organization's computers against a variety of threats, endpoint protection agents are typically installed by the organization on individual machines throughout the organization. These endpoint protection agents are designed to protect the machines against known and unknown outside threats to the organization. Such threats may include viruses, worms, Trojan horses, spyware, and adware. They can provide protection against even the most sophisticated attacks that evade traditional security measures such as rootkits, zero-day attacks, and spyware that mutates.

As the number of computing systems, such as desktop computers, laptop computers, handheld devices, mobile smart phone, tablets, netbooks, and so on, within an organization increases, so does the potential for security threats to originate within that organization. However, existing security compliance products and services, such as endpoint protection agents, do not measure the overall security posture of an individual computing system within an organization. Generally, these security compliance products and service have sophisticated and advanced products in place to anticipate threats that may be inbound to an organization. However, none of these security compliance products and services measures the overall security posture of the individual computing system and do not assess the threats that are originating from inside an enterprise.

SUMMARY

A mechanism for evaluating the security posture of a computer system is described.

In one embodiment, a method for evaluating the security posture of a computer system includes receiving data representing an event associated with a security component operating in an endpoint device, analyzing the received data to determine a score to assign to the event and a weighting factor to apply to the assigned score, updating a security component score of the security component with the assigned weighted score for the event, updating an overall security score for the endpoint device with the updated security component score, and providing the updated overall security score to an analysis component.

In some embodiments, the computing device is one of the endpoint device or an endpoint protection manager server device managing an endpoint protection agent of the endpoint device. Furthermore, in some embodiments, the method further comprises receiving, by the endpoint protection agent, one or more updated endpoint protection policies from the endpoint protection management server device, the one or more updated endpoint protection policies including changes to security policies that reflect the updated overall security score.

In some embodiments, the event is an event item that comprises one of: a configuration change, a system event, or a user event. In addition, in some embodiments, the security component score comprises a plurality of event item scores corresponding to a plurality of events including the event.

In some embodiments, the method further comprises analyzing, by the endpoint protection manager server device, the updated overall security score to determine if at least one of malicious or suspicious activity occurred with respect to the security component on the endpoint device. Furthermore, in some embodiments, the method further comprises applying a weighting factor to the security component score prior to updating the overall security score.

In some embodiments, the overall security score comprises a plurality of security component scores corresponding to a plurality of security components operating on the endpoint device and including the security component. In addition, in some embodiments, an independent security score authority supplies that the score to assign to the event and the weighting factor to apply to the assigned score. Furthermore, in some embodiments, security component comprises at least one of a virus and spyware protection component, a network threat protection component, and a proactive threat protection component.

In one embodiment, an apparatus includes a memory to store instructions for an endpoint protection policy and a processing device coupled with the memory. The processing device is configured to receive data representing an event associated with a security component operating in an endpoint device, analyze the received data to determine a score to assign to the event and a weighting factor to apply to the assigned score, update a security component score of the security component with the assigned weighted score for the event, update an overall security score for the endpoint device with the updated security component score, and provide the updated overall security score to an analysis component.

In one embodiment, a computer readable medium includes instructions that will cause a processor that executes the instructions to receive data representing an event associated with a security component operating in an endpoint device, analyze the received data to determine a score to assign to the event and a weighting factor to apply to the assigned score, update a security component score of the security component with the assigned weighted score for the event, update an overall security score for the endpoint device with the updated security component score, and provide the updated overall security score to an analysis component.

BRIEF DESCRIPTION OF THE DRAWINGS

The system and methods are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
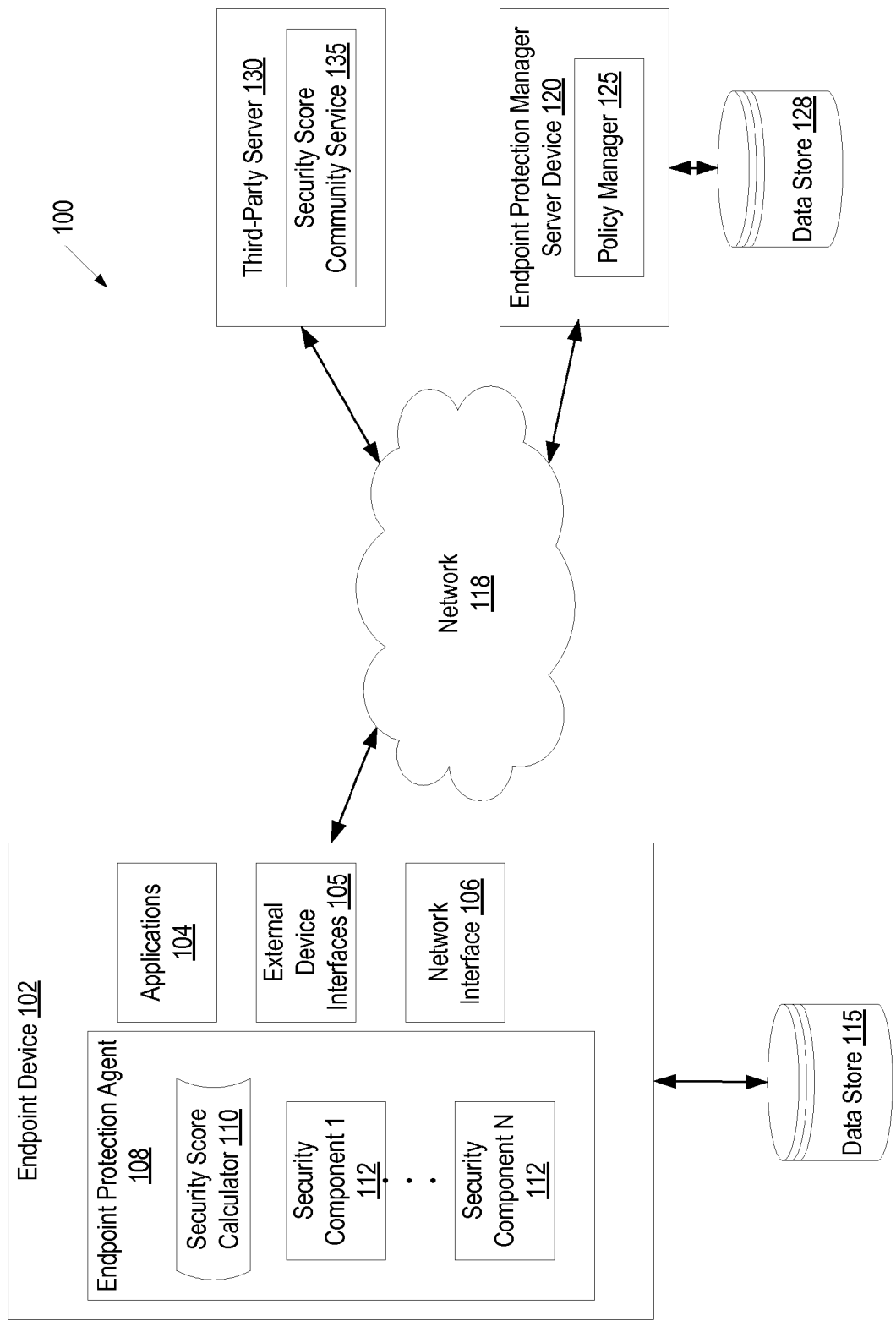
FIG. 1 illustrates an exemplary network architecture, in accordance with one embodiment of the present invention.

A system and method for evaluating the security posture of a computer system are described. In embodiments of the invention, a security score is calculated for an individual computing system, which takes into account various aspects of installed security components, system activity, and end-user activity on that particular computer system over time. This security score provides a mechanism to quantify the difference in security posture between user devices with a same software configuration, but taking different actions, within an organization. The security score conveys to the individual system user or to the administrator a concise rating depicting how various user and system actions affect the security posture of the specific computer, and possibly an entire organization. The security score may not directly prevent insider threats, but it does provide a strong indication that a specific person or machine is putting the overall security of the enterprise at risk.

In one embodiment, a method includes receiving data representing an event associated with a security component operating in an endpoint device, analyzing the received data to determine a score to assign to the event and a weighting factor to apply to the assigned score, updating a security component score of the security component with the assigned weighted score for the event, updating an overall security score for the endpoint device with the updated security component score, and providing the updated overall security score to an analysis component.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "accessing", "receiving", "determining", "restricting," "deleting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 illustrates an exemplary network architecture 100, in accordance with one embodiment of the present invention. The network architecture 100 includes an endpoint device 102 connected to an endpoint protection manager server device 120 via a network 118. The network 118 may be a private network (e.g., a local area network (LAN), wide area network (WAN), intranet, etc.), a public network (e.g., the Internet), or a combination thereof.

Endpoint protection manager server device 120 manages endpoint protection policies. Endpoint protection manager server device 120 may be a single server computing device, or may include a cluster of multiple server computing devices. Each server computing device may include one or more processing devices, memory, a data store 128, and other hardware components. In one embodiment, an endpoint protection policy is a data structure containing a rule or set of rules that govern the security features applied by an endpoint protection agent, such as endpoint protection agent 108. The endpoint protection policy may specify viruses, worms, Trojan horses, spyware, and adware definitions to monitor, network threat detection rules, and proactive threat detection rules, to name a few examples.

Endpoint protection policies may also include enforcement rules. Enforcement rules specify actions for endpoint protection agents 108 to take when a threat to the endpoint device 102 is identified. Examples of enforcement rules include rules to restrict operations, to notify an administrator of threat detections, and so on. For example, an enforcement rule may cause an endpoint protection agent 108 to send a notification to an administrator, prevent data from entering or exiting the endpoint device 102, lock down the endpoint device 102 so that no data can be removed from the endpoint device through any data loss vector, encrypt data, and/or restrict other operations, to name a few examples.

The endpoint protection manager server device 120 may manage endpoint protection policies by generating and modifying endpoint protection policies (e.g., based on administrator input) using policy manager 125. The endpoint protection policies may be stored in data store 128. The endpoint protection manager server device 120 may then propagate the endpoint protection policies to the endpoint device 102 and other endpoint devices (not shown). Additionally, the endpoint protection manager server device 120 may generate endpoint protection response rules, which it may also propagate to the endpoint device 102 (either as components of an endpoint protection policy or separately).

Each of the endpoint devices 102 may be, for example, a personal computer (PC), a laptop, a mobile phone, mobile smart phone, a tablet computer, handheld devices, netbooks, or any other computing device. Endpoint device 102 includes an endpoint protection agent 108 that implements endpoint protection policies to continually monitor endpoint device 102 for potential threats to the security of endpoint device 102. The endpoint device 102 runs an operating system (OS) (not shown) that manages hardware and software of the endpoint devices. The OS may be, for example, Microsoft® Windows®, Linux®, Symbian®, Apple's® OS X®, Solaris®, etc. The endpoint device 102 may further include applications 104, external device interfaces 105, and network interfaces 106 that can be monitored by the endpoint protection agent 102 as would be appreciated by one of ordinary skill in the art having the benefit of this disclosure. The endpoint device 102 may also include a local data store 115, which can be one or more centralized data repositories that store endpoint protection policy information, violation information, security scores, and the like.

In some embodiments, endpoint protection agent 108 contains several security components 112. Security components may include, but are not limited to, a virus and spyware protection component, a network threat protection component, and a proactive threat protection component. One skilled in the art will appreciate that other security components may also be included in endpoint protection agent 108, and various combinations of the above listed components may be included in endpoint protection agent 108.

A virus and spyware security component protects endpoint device 102 from viruses and security risks by scanning file and emails for definitions provided by an endpoint protection policy. The virus and spyware security component may also run scheduled scans and on-demand scans. Security risks detected may further include malware, adware, and other malicious files.

A network threat protection component provides a firewall and intrusion prevention protection to prevent intrusion attacks and malicious content from reaching the endpoint device 102. The firewall allows or blocks network traffic based on various criteria set in the endpoint protection policy. An intrusion prevention system (IPS) analyses all of the incoming and outgoing information for data patterns that are typical of an attack. These data patterns would be defined to the endpoint protection agent in a received endpoint protection policy. The IPS detects and blocks malicious traffic and attempts by outside users to attach the endpoint device 102. IPS also monitors outbound traffic and prevents the spread of worms.

A proactive threat protection component protects against zero-day attack vulnerabilities (new vulnerabilities that are not yet publicly known). Threats that exploit these vulnerabilities can evade signature-based detection, such as spyware definitions. A proactive threat detection component provides real-time behavioral protection by monitoring processes and threats as they execute. Endpoint protection policies provided to the endpoint protection agent 108 can supply heuristics and reputation data to aid in detecting these emerging and unknown threats.

Each of the security components 112 of endpoint protection agent 108 produce raw data, including information regarding the configuration of the particular security component 112, changes to the configuration of the particular security component 112, violations detected by the security component 112, threats detected by the security component 112, and events occurring on the security component 112, to name a few examples. This data is collected by endpoint protection agent 108 for eventual communication to the endpoint protection manager server device 120. Embodiments of the invention utilize the data produced by each security component 112, as well as knowledge of the general security settings of the endpoint device 102 outside of the endpoint protection agent 108, to compute a security score that reflects the overall security posture of the endpoint device 102.

In one embodiment, endpoint protection agent 108 includes a security score calculator 110 that is configured to calculate the security score of endpoint device 102. In some embodiments, the security score is a single numeric value. It is composed of separate scores for each individual security component 112 of endpoint protection agent 108. In the security context, the score is higher as more security components, technologies, or products are installed. It is lower as these components are disabled or configured to be less secure. The security score may also be lowered based on the frequency with which changes are made, by system failures of the end user, or by the number of threats that are detected but not resolved. Further detail regarding some embodiments of operations of endpoint protection agent 108, such as computing a security score for endpoint device 102 is now described with respect to FIG. 2.

Figure 2:
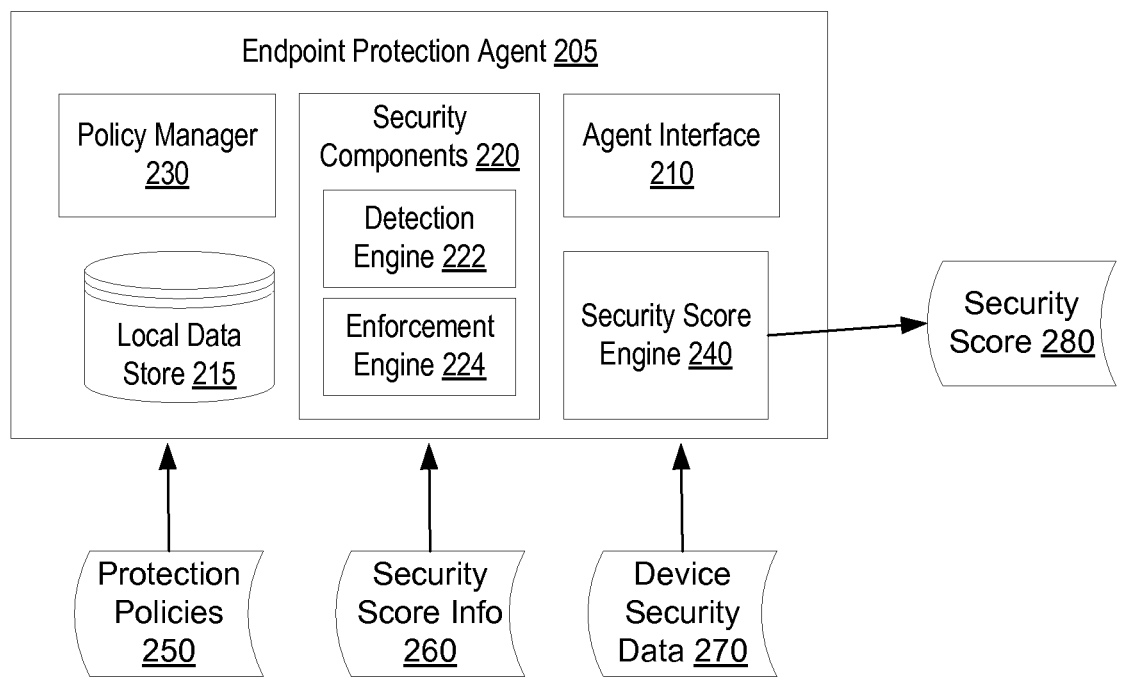
FIG. 2 is a block diagram of an endpoint protection agent, in accordance with one embodiment of the present invention.

FIG. 2 illustrates a block diagram of endpoint protection agent 205 according to embodiments of the invention. In one embodiment, endpoint protection agent 205 is the same endpoint protection agent 108 described in FIG. 1. Endpoint protection agent 205 includes an agent interface 210, security components 220, a policy manager 230, and a security score engine 240. In alternative embodiments, one or more of the agent interface 210, security components 220, policy manager 230, and security score engine 240 may be combined into a single module or divided into multiple modules. Endpoint protection agent 205 may be implemented as a standalone application, as a plug-in or extension to an application, or as a combination of both. Additionally, some of the modules (or operations of some modules) may run at a kernel level, while other modules and/or operations run at a user level.

Endpoint protection agent 205 enforces one or more endpoint protection policies. In one embodiment, endpoint protection agent 205 enforces an endpoint protection policy 250 that is received from an endpoint protection manager, such as endpoint protection manager server device 120, and may be activated on or after receipt. As part of enforcing these endpoint protection policies, endpoint protection agent is able to evaluate the security posture of the endpoint device it is executing on and provide an overall security score for the endpoint device to an endpoint protection manager.

In one embodiment, a policy manager 230 is responsible for receiving and distributing endpoint protection policies to the appropriate security component of endpoint protection agent 205 that can implement the endpoint protection policy 240. One or more security components 220 implement the received endpoint protection policies to provide the endpoint device (that the endpoint protection agent is operating on) protection from various threats. In one embodiment, security components 220 are the same as security components 112 described with respect to FIG. 1. As mentioned above, security components 220 may include protections such as virus and spyware protections, network threat protections such as firewall protection, real-time file system protections, proactive threat protections such as IPS, and so on.

Each security component 220 may include a detection engine 222 to monitor the endpoint device for various events and threats, based on the definitions, patterns, signatures, etc., provided in the received endpoint protection policies. In addition, detection engine 222 monitors for any configuration changes made to the particular security component 220. Detection engine 224 reports this information to agent interface 210 for further communications to the endpoint protection manager, such as endpoint protection manager 120 described with respect to FIG. 1.

In one embodiment, agent interface 210 provides all reported information from security component 220 to a security score engine 240. In one embodiment, security score engine 240 is the same as security score calculator 110 described with respect to FIG. 1. Security score engine 240 aggregates the information received from all security components 220, as well as general security information 270 about the system of the endpoint device itself (e.g., operating system firewall information, operating system file system protections, etc.), in order to calculate a security score 280 for the endpoint device.

The security score 280 is a calculated value that takes into account all aspects of installed security components, system and end user activity of the endpoint device. The security score 280 provides a mechanism to quantify a difference in security posture between users with the same software configuration, who take different actions on their individual endpoint devices. For instance, given two users with identical software configurations, if one user often disables and re-enables the installed firewall to allow for specific download activity, while the other user does not, the first user will have a lower security score 280 compared to the other user.

The security score 280 reflects the input that each of one or more security products and components 220 installed in the endpoint protection agent 205 have on the overall security of the endpoint device. The security score engine may utilize information provided in protection policies 250 and security score info 260 in order to assign values and weights to each security item and security component, as discussed below.

In one embodiment, the security score 280 is a single numeric value made up of component scores for each security component 220 and a weighting factor for the security component 220. The security score 280 is an open-ended value, so that the more security components 220 operating on an endpoint device, the higher the security score 280 will be. The security score engine 240 determines a score for an individual security component 220 by taking into account all of the security items falling within the scope of that security component 220. A "security item" as described herein is the lowest level security element in a security component 220, and may comprise individual system events, individual user events, and configuration changes within a security component 220. Each security item is also assigned a weighting factor to reflect its importance to the overall security component score. In one embodiment, this weighting factor may account for effectiveness of products of the same type provided by different vendors (e.g., a built-in firewall of the OS vendor vs. a third-party provided firewall).

In one embodiment, a security item includes, but is not limited to, a security item type, a timestamp for a most recent occurrence of the security item, a number of occurrences of the security item, and a frequency value of the security item. In one embodiment, there are three security item types including: configuration setting, system event, and user events.

A configuration item type indicates the presence of certain capabilities within a security component 220. For example, assume that a file system real-time protection security component includes a capability to capture file activity on network-based files. In this case, the file system real-time protection is the security component, and the 'capture file activity on network-based files' setting is the security item within the security component. The security item of this 'capture file activity on network-based files' setting is a configuration setting item type. Any time this particular configuration setting is set or modified, data regarding the timestamp, number of occurrences, and frequency would be tracked for this setting. Then, the component score for the file system real-time protection security component would be updated to the affect the configuration setting has on the security of the system. In this particular case, activating the 'capture file activity on network-based files' setting would add to the component score for the file system real-time protection security component, which in turn increases the overall security score of the endpoint device.

A system event item type reflects a condition that occurs within the component itself. For example, in the real-time protection context, an example of a system event item type includes the system disabling and re-enabling the real-time protection. Another example of a system event item type is the system shutting down real-time protection drivers during system shutdown.

A user event item type reflects a condition resulting from a direction action taken by the end user that effects the operating configuration of the security component. Continuing the real-time protection context scenario, an example of a user event item type includes any action taken by an end user through available user interface mechanisms that enable or disable real-time protection. This may include any all controls in dialog boxes, system icons, context menus, and so on.

In addition, the security score engine 240 receives general security information 270 of the endpoint device, such as security protections put in place by the OS of the endpoint device (e.g., firewall, file system protections, clock protection logic, recovery mode information, etc.). The security score engine 240 takes this device security data 270 into consideration as part of the security score 280 as well. Each different security component implemented by the endpoint device will receive security component score, broken down into security items, similar to that described above.

In some embodiment, the security score engine 240 may calculate the security score 280 upon receipt of any security item notification by the security score engine 240. In other embodiments, the security score engine 240 may calculate or update the security score 280 at pre-determined time intervals. In addition, although embodiments of the invention have been described as calculating the security score at the endpoint protection agent 205, one skilled in the art will appreciate that the security score may be calculated on a component separate form the endpoint protection agent 205 on the endpoint device 102. In addition, the security score may be calculated at the endpoint protection manager server device 120. In this case, the endpoint protection agent sends the raw data gathered by the endpoint protection agent 205 up to the endpoint protection manager server device 120 in order for the endpoint protection manager to perform the security score calculations. Where the security score calculation is done may be implementation-dependent, and determined by various inputs such as resource consumption at the end point device and endpoint protection manager server device, for instance.

Once the security calculation is completed, the score may be stored at the local data store 215 of the endpoint protection agent 205, on a data store of the endpoint device, such as data store 115, and/or on a data store 128 associated with the endpoint protection manager server device 120. In one embodiment, the security score 280 is analyzed by the endpoint protection manager to provide feedback for endpoint protection policies put in place by the endpoint protection agent. For example, a security score 280 that is demonstrating a decreasing trend may trigger an alert to the end user of the endpoint device that their actions are affecting the security posture of the end point device. Furthermore, the security score may provide notice to the administrator to take a closer look at what others in the group including the end user are doing to provide further context into the end user's actions. Moreover, the security score 280 may prompt more direct actions to be taken against the end user and endpoint device, such as implementing security policies and security configuration changes that prevent the end user from taking certain actions that are negatively altering the security score. One skilled in the art will appreciate that there are a variety of different actions that may be possible based on an analysis of a received security score.

In some embodiments, the security score is applicable to security components from any vendor. As a result, in a multi-vendor environment, the security score 280 can provide an "apples-to-apples" comparison of the security posture of users with different security products. In addition, capabilities of different products can be reflected in the score. For example, if one product functions in an "on-demand" basis, while another product provides "real-time" capabilities, then the latter will have an additional security item within the security component, which results in a higher security score 280.

One skilled in the art will appreciate that the specific algorithm and calculations to produce the security score in embodiments of the invention may vary and are adjustable based on the relative importance of a security component and a security item to overall security posture of a system. In some embodiments, the scoring values are built into the endpoint protection product directly, and are provided in endpoint protection policies or as separate input from the central endpoint protection manager. In other embodiments, an independent security score community may provide guidance on values and/or a scoring database to assign scoring values and weights to different security components and security items. As shown in FIG. 1, a third-party server 130 may host a security score community service 135 that acts as a governing body to ensure fairness and consistency in the application of security scores. The security score community service 135 may provide input to the endpoint protection manager server device 120 regarding scores, weights, and algorithms associated with computing a security score. The policy manager 125 may, in turn, integrate this provided information into its policies, which are then deployed out to the various endpoint protection agents 108 on endpoint devices 102 for implementation.

Figure 3:
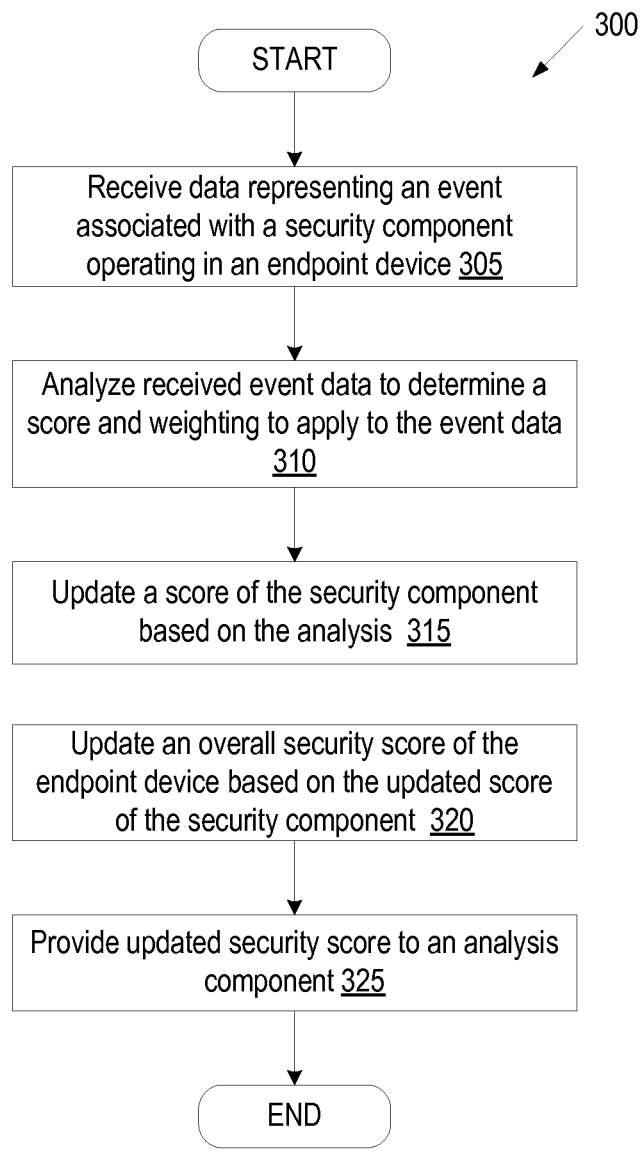
FIG. 3 is a flow diagram illustrating one embodiment for a method of evaluating the security posture of a computer system.

FIG. 3 is a flow diagram illustrating one embodiment for a method 300 of evaluating the security posture of a computer system. The method 300 is performed by processing logic that may comprise hardware (circuitry, dedicated logic, etc.), software (such as is run on a general purpose computer system or a dedicated machine), or a combination of both. Method 300 may be performed by an endpoint protection agent such as endpoint protection agent 205 of FIG. 2. However, other embodiments envision that endpoint protection manager server device 120 of FIG. 1 may perform method 300, that a component on the endpoint device separate from the endpoint protection agent may perform method 300, or some combination of the above.

Referring to FIG. 3, at block 305 processing logic receives data representing an event associated with a security component operating in an endpoint device. In one embodiment, the event is at least one of a configuration change, a system event, or a user event. The security component may be one of several security features operating on an endpoint device of the endpoint protection agent, such as a firewall component, a virus and spyware protection component, a network threat component, or a proactive threat detection component, to name a few examples.

At block 310, the received data event is analyzed to determine a score and weighting to apply to the event. In one embodiment, a score database stored at the endpoint device may be referenced with the event data to determine the score and weighting. In other embodiments, an independent scoring authority may provide the scoring and weighting data for the event. Subsequently, at block 315, a score of the security component producing the event is updated based on the analysis and score determine for the event from block 310. In some embodiments, the updated score of the security component is also weighted according to information provided in the score database or by the independent scoring authority.

At block 320, an overall security score of the endpoint device is updated to reflect the updated security component score produced in block 315. In some embodiments, an algorithm, such as a summation of weighted security components or a product of all weighted security components, produces the security score. One skilled in the art will appreciate that there are a variety of equations that can be used to account for each security item in varying fashions that are encompasses by embodiments of the invention. Lastly, at block 325, the updated security score is provided to an analysis engine, such as an endpoint protection manager.

Figure 4:
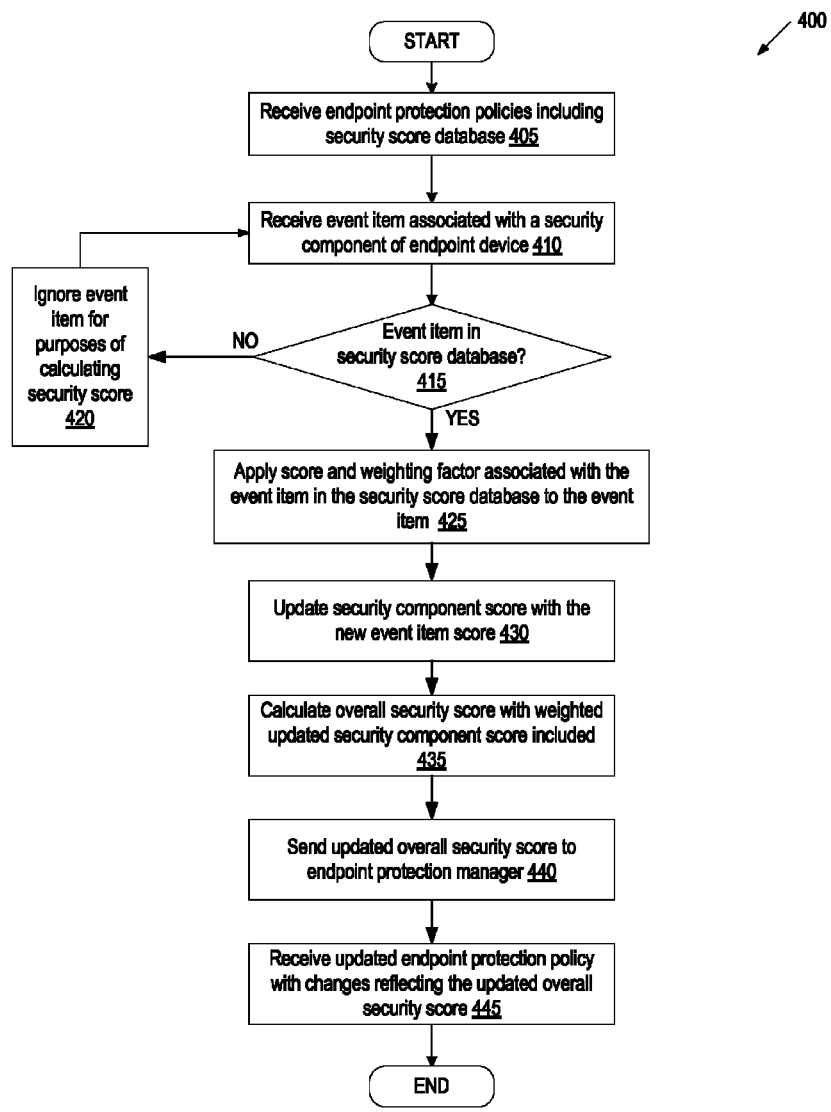
FIG. 4 is a flow diagram illustrating another embodiment for a method of evaluating the security posture of a computer system.

FIG. 4 is a flow diagram illustrating another embodiment for a method 400 of evaluating the security posture of a computer system. The method 400 is performed by processing logic that may comprise hardware (circuitry, dedicated logic, etc.), software (such as is run on a general purpose computer system or a dedicated machine), or a combination of both. Method 400 may be performed by an endpoint protection agent such as endpoint protection agent 205 of FIG. 2.

Referring to FIG. 4, at block 405 endpoint protection agent receives endpoint protection policies that include a security score database. In one embodiment, the security score database is created by an endpoint protection manager overseeing the endpoint protection agent. In other embodiments, an independent security score authority may create and dispense the security score database, which is eventually passed on to the endpoint protection agent. At block 410, an event item is received at the endpoint protection agent. The event item is associated with a security component of the endpoint device. The security component may be one of several security features operating on an endpoint device of the endpoint protection agent, such as a firewall component, a virus and spyware protection component, a network threat component, or a proactive threat detection component, to name a few examples. In one embodiment, the event is at least one of a configuration change, a system event, or a user event.

At decision block 415, it is determined whether the event item can be found in the received security score database. If not, the event item is ignored for purposes of calculating a security score for the endpoint device at block 420. Method 400 then returns to block 410 to continue receiving event items. On the other hand, if the event item is found in the security score database at decision block 415, then method 400 proceeds to block 425.

At block 425, a score and weighting factor are applied to the event item. The score and weighting factor are associated with the event item in the security score database. The score and the weighting factor for the event item reflect the contribution that the event item makes towards the security posture of the endpoint device. At block 430, a score for a security component producing the event item is updated with the new event item score. In some embodiments, the updated score of the security component is also weighted according to information provided in the score database or by the independent scoring authority.

Subsequently, at block 435, an overall security score for the endpoint device is re-calculated with the updated security component score from block 430 included in the calculation. In some embodiments, an algorithm, such as a summation of weighted security components or a product of all weighted security components, produces the security score. One skilled in the art will appreciate that there are a variety of equations that can be used to account for each security item in varying fashions that are encompasses by embodiments of the invention. This calculated overall security score is then sent to the endpoint protection manager at block 440.

Lastly, at block 445, an updated endpoint protection policy is received from the endpoint protection manager. This updated endpoint protection policy includes changes that reflect the updated overall security score that was sent to the endpoint protection manager in block 440. For example, if the overall security score decreased dramatically over previous scores of the endpoint device, then endpoint protection manager may deploy an endpoint protection policy to the endpoint device that implements a strict security policy preventing the user from performing certain actions related to the security components and security items that negatively affected the security score.

Figure 5:
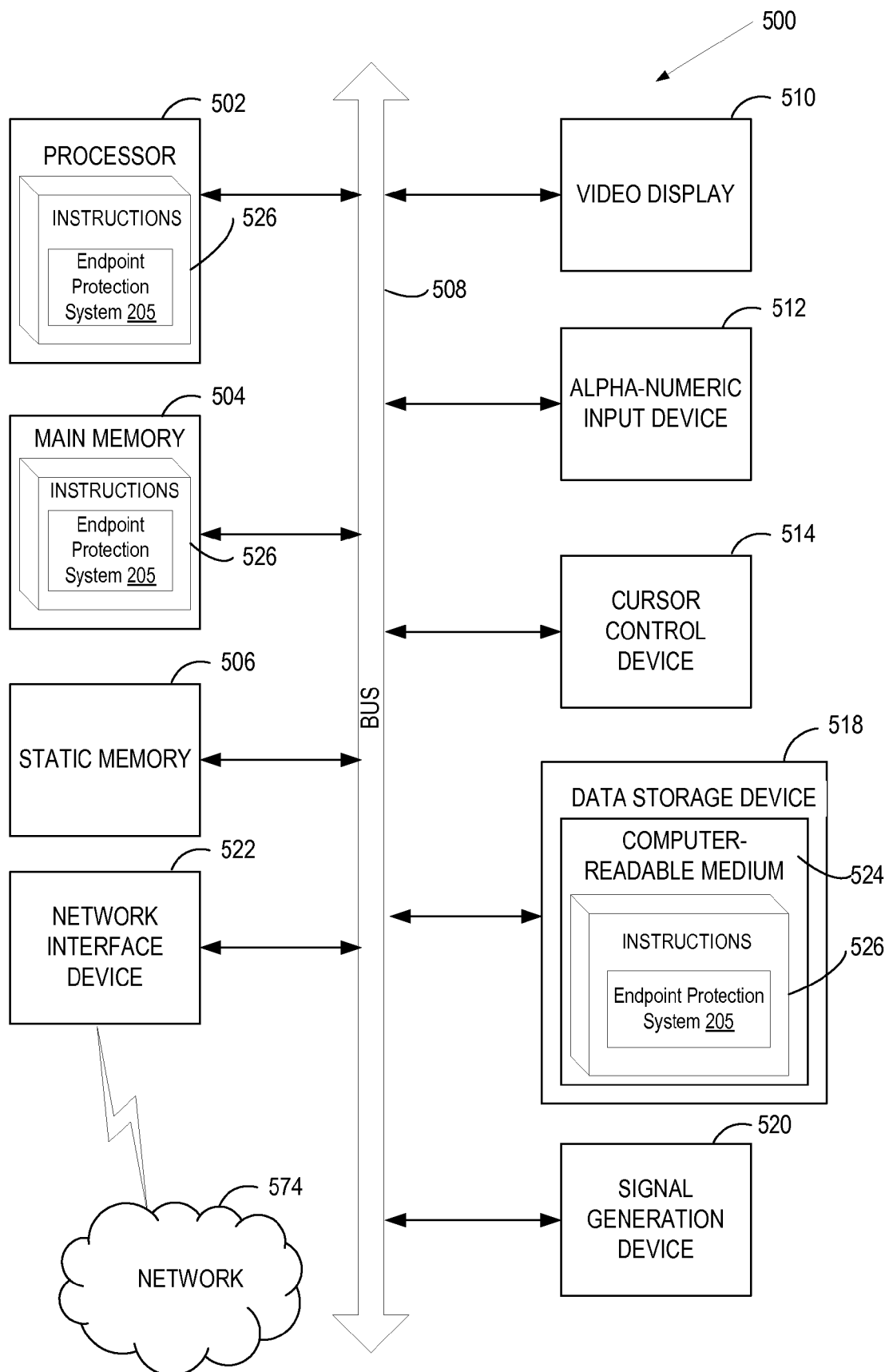
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for an endpoint protection agent that evaluating the security posture of a computer system (e.g., such as endpoint protection agent 205 of FIG. 2) and/or a software library containing methods that call such an endpoint protection agent. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In some embodiments, the above-described mechanism for evaluating the security posture of a computer system, such as endpoint protection agents 108, 205, endpoint protection manager 120, and methods 300 and 400 described in FIGS. 1 through 4, may be implemented as part of a cloud-computing environment.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:

receiving, by a computing device, data representing an event associated with a security component operating in an endpoint device;

analyzing the received data to determine a score to assign to the event and a weighting factor to apply to the assigned score;

updating a security component score of the security component with the assigned weighted score for the event, wherein the security component score is generated in view of events occurring at the security component with respect to outside threats to the endpoint device, system activity at the endpoint device with respect to configuration of the security component, and actions of an end user of the endpoint device with respect to changing security configurations of the security component on the end point device;

updating an overall security score for the endpoint device with the updated security component score, wherein the overall security score is generated in view of security component scores of the endpoint device and general security settings of the endpoint device that are outside of a scope of the security component scores; and providing the updated overall security score to an analysis component.

2. The method of claim 1, wherein the computing device is one of the endpoint device or an endpoint protection manager server device managing an endpoint protection agent of the endpoint device.

3. The method of claim 2, further comprising receiving, by the endpoint protection agent, one or more updated endpoint protection policies from the endpoint protection management server device, the one or more updated endpoint protection policies including changes to security policies that reflect the updated overall security score.

4. The method of claim 1, wherein the event is an event item that comprises one of: a configuration change, a system event, or a user event.

5. The method of claim 4, wherein the security component score comprises a plurality of event item scores corresponding to a plurality of events including the event.

6. The method of claim 2, further comprising analyzing, by the endpoint protection manager server device, the updated overall security score to determine if at least one of malicious or suspicious activity occurred with respect to the security component on the endpoint device.

7. The method of claim 1, further comprising applying a weighting factor to the security component score prior to updating the overall security score.

8. The method of claim 1, wherein the overall security score comprises the security component scores that correspond to a plurality of security components operating on the endpoint device and including the security component.

9. The method of claim 1, wherein an independent security score authority supplies the score to assign to the event and the weighting factor to apply to the assigned score.

10. The method of claim 1, wherein the security component comprises at least one of a virus and spyware protection component, a network threat protection component, and a proactive threat protection component.

11. An apparatus, comprising:
a memory; and
a processing device coupled with the memory, wherein the processing device is configured to:
  receive data representing an event associated with a security component operating in an endpoint device;
  analyze the received data to determine a score to assign to the event and a weighting factor to apply to the assigned score;
  update a security component score of the security component with the assigned weighted score for the event, wherein the security component score is generated in view of events occurring at the security component with respect to outside threats to the endpoint device, system activity at the endpoint device with respect to configuration of the security component, and actions of an end user of the endpoint device with respect to changing security configurations of the security component on the end point device;
  update an overall security score for the endpoint device with the updated security component score, wherein the overall security score is generated in view of security component scores of the endpoint device and general security settings of the endpoint device that are outside of a scope of the security component scores; and
  provide the updated overall security score to an analysis component.

12. The apparatus of claim 11, wherein the computing device is one of the endpoint device or an endpoint protection manager server device managing an endpoint protection agent of the endpoint device.

13. The apparatus of claim 11, wherein the processing device further configured to analyze the updated overall security score to determine if at least one of malicious or suspicious activity occurred with respect to the security component on the endpoint device.

14. The apparatus of claim 11, wherein the overall security score comprises the security component scores that correspond to a plurality of security components operating on the endpoint device and including the security component.

15. The apparatus of claim 11, wherein an independent security score authority supplies the score to assign to the event and the weighting factor to apply to the assigned score.

16. A non-transitory computer readable storage medium including instructions that, when executed by a processing device, cause the processing device to perform a method comprising:
  receiving, by a computing device comprising the processing device, data representing an event associated with a security component operating in an endpoint device;
  analyzing the received data to determine a score to assign to the event and a weighting factor to apply to the assigned score;
  updating a security component score of the security component with the assigned weighted score for the event, wherein the security component score is generated in view of events occurring at the security component with respect to outside threats to the endpoint device, system activity at the endpoint device with respect to configuration of the security component, and actions of an end user of the endpoint device with respect to changing security configurations of the security component on the end point device;
  updating an overall security score for the endpoint device with the updated security component score, wherein the overall security score is generated in view of security component scores of the endpoint device and general security settings of the endpoint device that are outside of a scope of the security component scores; and
  providing the updated overall security score to an analysis component.

17. The non-transitory computer readable storage medium of claim 16, wherein the computing device is one of the endpoint device or an endpoint protection manager server device managing an endpoint protection agent of the endpoint device.

18. The non-transitory computer readable storage medium of claim 17, further comprising receiving, by the endpoint protection agent, one or more updated endpoint protection policies from the endpoint protection management server device, the one or more updated endpoint protection policies including changes to security policies that reflect the updated overall security score.

19. The non-transitory computer readable storage medium of claim 16, wherein the event is an event item that comprises one of: a configuration change, a system event, or a user event.

20. The non-transitory computer readable storage medium of claim 16, wherein the overall security score comprises the security component scores that correspond to a plurality of security components operating on the endpoint device and including the security component.

\* \* \* \* \*